United States Patent
Cooper et al.

(10) Patent No.: US 10,133,564 B2
(45) Date of Patent: *Nov. 20, 2018

(54) APPLICATION WRAPPING SYSTEM AND METHOD

(71) Applicant: BMC SOFTWARE, INC., Houston, TX (US)

(72) Inventors: Adam Charles Cooper, Vancouver (CA); George Thucydides, North Vancouver (CA); Geoffrey Ross Mair, Vancouver (CA); Caleb Peter Buxton, Vancouver (CA)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,216

(22) Filed: Dec. 20, 2016

(65) Prior Publication Data

US 2017/0102928 A1    Apr. 13, 2017

Related U.S. Application Data

(63) Continuation of application No. 14/136,879, filed on Dec. 20, 2013, now Pat. No. 9,535,674.

(Continued)

(51) Int. Cl.
*G06F 9/445* (2018.01)
*G06F 8/60* (2018.01)
(Continued)

(52) U.S. Cl.
CPC .................. *G06F 8/60* (2013.01); *G06F 8/61* (2013.01); *G06F 8/65* (2013.01); *G06F 9/541* (2013.01)

(58) Field of Classification Search
CPC ..... G06F 8/60; G06F 8/61; G06F 8/65; G06F 9/541
(Continued)

(56) References Cited

U.S. PATENT DOCUMENTS 8,549,656 B2   10/2013   Blaisdell et al.
9,535,674 B2 *  1/2017   Cooper ..................... G06F 8/60
(Continued)

OTHER PUBLICATIONS

Notice of Allowance for U.S. Appl. No. 14/136,879, dated Jun. 6, 2016, 8 pages.
(Continued)

*Primary Examiner* — Ted T Vo
(74) *Attorney, Agent, or Firm* — Brake Hughes Bellermann LLP

(57) ABSTRACT

A method of administering a computing system, including a plurality of computing devices. The method includes selecting an application for inclusion in a menu of applications downloadable to a computing device and interposing a wrapper on the application before the computing device downloads the application, the wrapper being configured to control an operation of the application. Interposing the wrapper on the application includes decompiling the application, searching for string patterns, and replacing the string patterns with another string pattern, the another string pattern being configured to intercept at least one of a system event or an Application Programming Interface (API) call and associating logic with the application. The logic is configured to interact with the application via the at least one system event or API call, the logic is configured to provide additional functions to the application, and the logic is stored separate from the application.

27 Claims, 15 Drawing Sheets

Related U.S. Application Data

(60) Provisional application No. 61/745,511, filed on Dec. 21, 2012.

(51) Int. Cl.
*G06F 8/61* (2018.01)
*G06F 8/65* (2018.01)
*G06F 9/54* (2006.01)

(58) Field of Classification Search
USPC .................................................. 717/168–178
See application file for complete search history.

(56) References Cited

U.S. PATENT DOCUMENTS

| | | |
|---|---|---|
| 2012/0210443 A1 | 8/2012 | Blaisdell et al. |
| 2013/0283335 A1 | 10/2013 | Lakshminarayanan et al. |
| 2014/0007048 A1 | 1/2014 | Qureshi et al. |
| 2014/0109072 A1 | 4/2014 | Lang et al. |
| 2014/0109078 A1 | 4/2014 | Lang et al. |
| 2014/0181803 A1 | 6/2014 | Cooper et al. |

OTHER PUBLICATIONS

"Package—android.drm", developer.android.com retrieved from https://web.archive.org/web/20111202092042/http:I/developer.android.com/reference/android/drm/package-summary.html, Nov. 2011, 3 Pages.

U.S. Appl. No. 14/136,879, "Final Office Action Received", dated Jan. 5, 2016, 10 pages.

U.S. Appl. No. 14/136,879, "Non-Final Office Action Received", dated Dec. 18, 2014, 11 Pages.

U.S. Appl. No. 14/136,879, "Non-Final Office Action Received", dated Jun. 5, 2015, 9 pages.

Kilpatds, "Generic Software Wrappers Toolkit", a project introduction retrieved from http://freecode.com/users/kilpatds, 2001, 1 page.

* cited by examiner

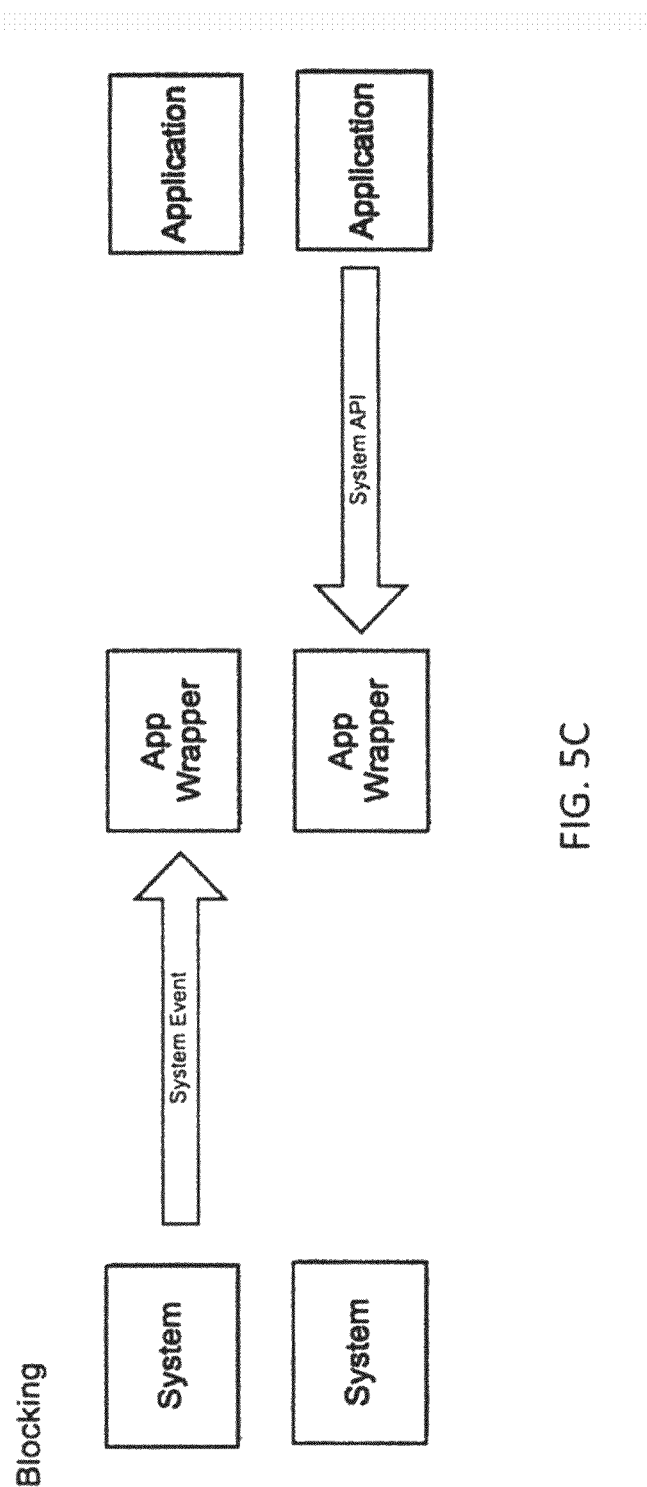

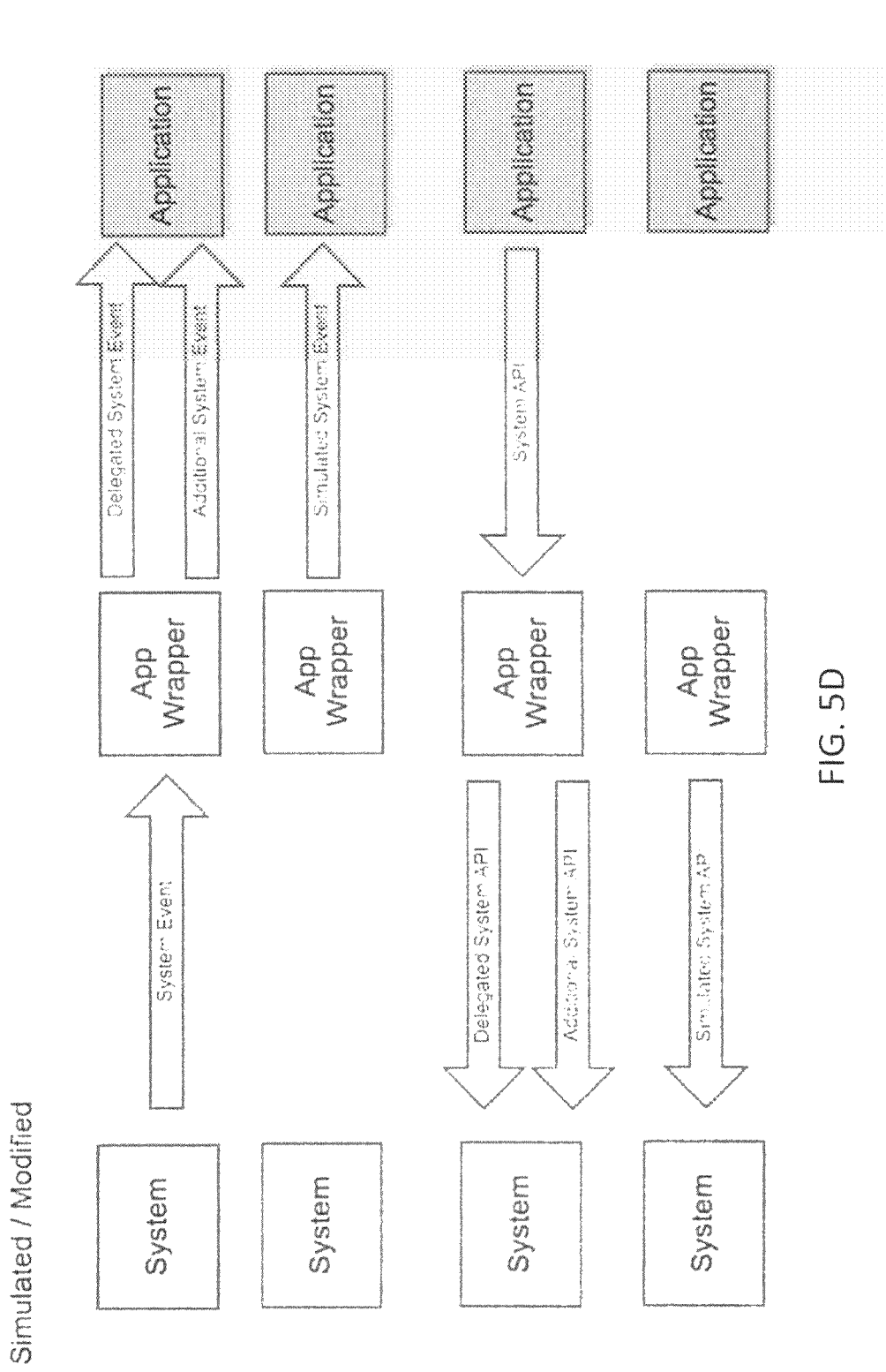

Logic in an Application

Additional Logic in a Remote System

APPLICATION WRAPPING SYSTEM AND METHOD

This application is a continuation of U.S. application Ser. No. 14/136,879, filed Dec. 20, 2013, entitled "Application Wrapping System and Method", which claims the benefit of U.S. Provisional Patent Application 61/745,511 filed on Dec. 21, 2012 entitled Application Wrapping System and Method, the entire contents of which are incorporated herein by reference.

FIELD

Embodiments relate to software and mobile computing devices. More specifically, it relates to the distribution and control of pre-built or commercially available applications, and the implementation of rules and policies associated with those applications.

BACKGROUND

Applications developed for mobile devices are distributed in a package containing the necessary elements to run the application such as the program code, resources, assets, certificates and manifest. Typically, an application is compiled from the source code and then packaged with the required elements. An application package is then signed and distributed to a device or emulator.

FIG. 1 shows an example packaging flow for an application developed using the Android operating system and distributed in an Android Package File (APK). An Android application, such as the one shown in FIG. 1, is typically written using the Android Software Development Kit (SDK) and in the Java language. During compilation and packaging, the Java code is first compiled into class files in the Java bytecode format. Next the "dx" tool converts the class files containing bytecode into ".dex" files in the Dalvik bytecode, where the Dalvik bytecode is the native format of the Android operating system. If desired, the ".dex" files can be converted into "smali" files using a file format converter called "apktool".

FIG. 1 shows an example application package (in this case a ".apk" Android Package) comprising the program code in ".dex" files, resources in a resources.arsc file, plus uncompiled resources and a manifest file (AndroidManifest.xml). A command line tool such as Android Debug Bridge (indicated as ADB in FIG. 1) allows the code to communicate with an emulator or an Android device. This may be beneficial during application development as a way to test and debug the application.

Application wrapping is a method of adding a layer to an existing mobile application binary file to add features or modify behavior, without requiring changes to the underlying existing application. For example, native iOS or Android applications can be wrapped to add a management layer to the existing application. In this way, a system administrator can exert control over an application and can set specific rules and policies to be applied to an application or group of applications. Example policies include whether or not user authentication is required for a specific application, whether or not data associated with the application can be stored on the device, and whether or not specific Application Program Interfaces (APIs) such as copy/paste or file sharing are allowed. Other example policies can include when the application can run (such as, for example, day and time of day) and the location from which it can run.

In an enterprise environment, application wrapping increases the level of control and the ease with which control can be applied to specific end users and applications. Application wrapping reduces the risk to the enterprise of unauthorized or improper use of mobile applications. For example, an administrator can take an application, add extra security and management features to it, and then deploy it in the enterprise as a single application package via an enterprise app store.

Typically application wrapping methods are part of the application compilation workflow process. There is a need, however, for technique to wrap pre-built or commercial applications without the involvement of the developer.

Existing technique focuses on application security for non-commercial applications, namely, applications developed in-house. Nonetheless the majority of mobile applications are commercially developed and available via app stores. There is a need for technique to support new license management models where the identity of an enterprise customer can be associated with an application for the purposes of license management, and also application authorization and security policy enforcement.

Existing Mobile Device Management (MDM) technique, for example, relates to securing and managing devices deployed across an enterprise, and does not provide the functional benefits enabled by the present application wrapping technique.

Other existing approaches include (a) the use of virtual machines, (b) a developer writing the added functionality from scratch or using a library, and (c) having the device itself provide the functionality.

SUMMARY

One embodiment includes a method of administering a computing system, including a plurality of computing devices. The method includes selecting an application for inclusion in a menu of applications downloadable to a computing device and interposing a wrapper on the application before the computing device downloads the application, the wrapper being configured to control an operation of the application. Interposing the wrapper on the application includes decompiling the application, searching for string patterns, and replacing the string patterns with another string pattern, the another string pattern being configured to intercept at least one of a system event or an Application Programming Interface (API) call and associating logic with the application. The logic is configured to interact with the application via the at least one system event or API call, the logic is configured to provide additional functions to the application, and the logic is stored separate from the application.

Another embodiment includes a computing system including a plurality of computing devices. The system includes a menu of applications downloadable to a computing device, code segments, that when executed by a processor, enable the computing device to download an application, and code segments, that when executed by the processor, administer a wrapper configured to control operation of the application. The administering of the wrapper includes decompiling the application, searching for string patterns, replacing the string patterns with another string pattern, the another string pattern being configured to intercept at least one of a system event or an Application Programming Interface (API) call, and associating logic with the application. The logic is configured to interact with the application via the at least one system event or API call, the logic is configured to provide additional functions to the application, and the logic is stored separate from the application.

Implementations can include one or more of the following features. For example, the application can be downloaded from the menu of applications. The downloading can be performed indirectly via an intermediate server. The wrapper can be configured to control distribution and use of the application. The wrapper can be configured to verify that the computing device can be authorized to download the application. The wrapper can be configured to control storage of data associated with the application in the computing device. The data can be fetched by the application. The data can be generated by the application.

For example, the controlling of the storage of data can include prohibiting storage of data associated with the application in the computing device. The wrapper can be configured to control access to the API. The API can be configured to at least one of cut, copy and paste data between or within applications, and the wrapper can be configured to interact with the API in order to control one of the cut, copy and paste data between or within applications. The API can be configured to control file sharing between or within applications, and the wrapper can be configured to interact with the API in order to control file sharing between or within applications. The wrapper can be configured to impose at least one of day and time-of-day restrictions on operating the application. The wrapper can be configured to impose location-of-use restrictions on operating the application.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 5B-5D illustrate a processing of system calls for interception, blocking and simulation, respectively according to at least one example embodiment.

Figure 1:
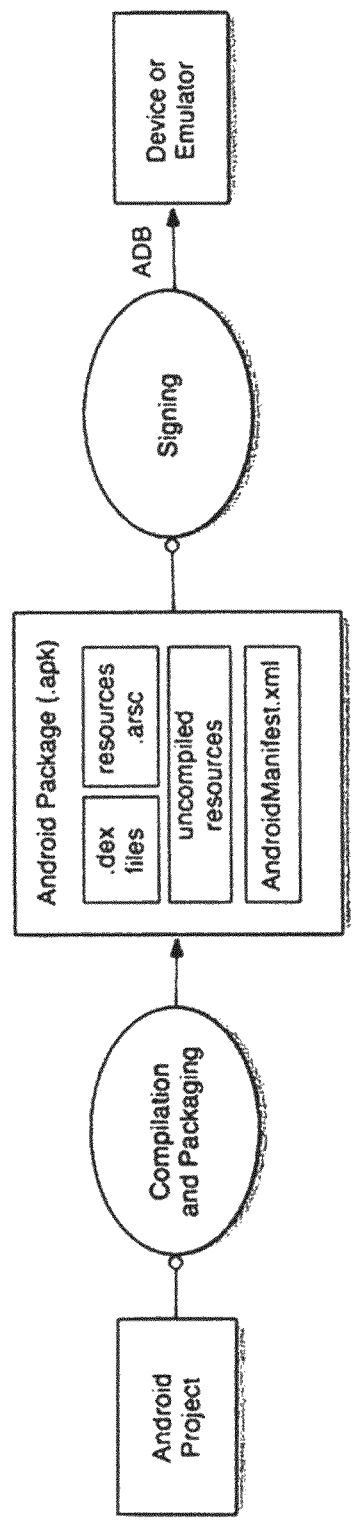
FIG. 1 illustrates a representative packaging flow diagram for an application that is developed using existing techniques.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Definition of Terms

Application (also known as an app): Application software written for computing devices.

Mobile application (also known as a mobile app or an app): Application software written for mobile computing devices.

Application wrapping: A method of adding a layer to an existing application (e.g., mobile application) binary code to add features or modify functionality, without requiring changes to the underlying existing application.

Application (or app) wrapper: A layer of code added to existing application (e.g., mobile application) binary code for the purposes of adding features or modifying behavior of the underlying application.

API: Application Programming Interface.

Application Package: Software including an application and the necessary elements to run the application such as the program code, resources, assets, runtime, certificates and/or manifest.

Description

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Figure 2A:
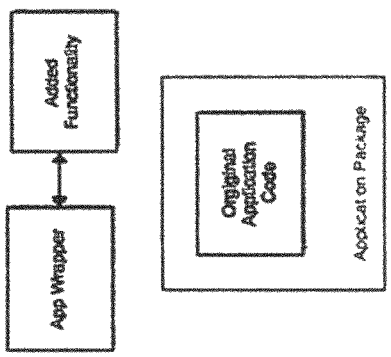
FIGS. 2A and 2B illustrate block diagrams showing principal components of application wrapping according to at least one example embodiment.
Figure 2A:
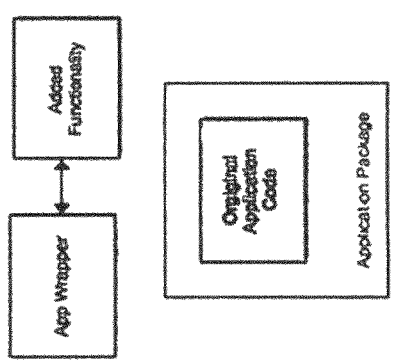
Figure 2A:
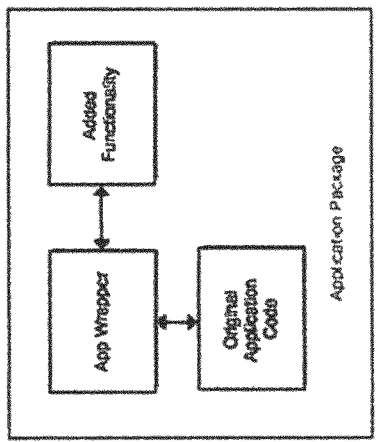
Figure 2B:
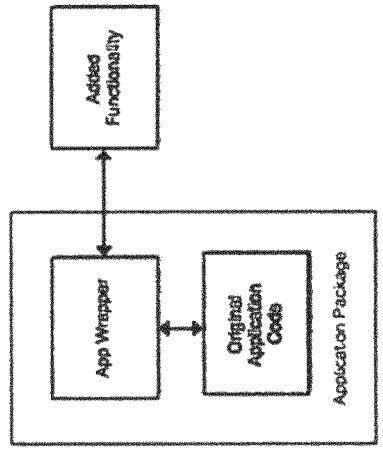

FIGS. 2A and 2B are block diagrams showing principal components of application wrapping, with added functionality inside and outside the application package, respectively. FIGS. 2A and 2B illustrate that the components can be combined in an application package using an application (or app) wrapping process.

FIGS. 2A and 2B show an application package, before app wrapping, which includes the original application code. In this example implementation, an app wrapper and optionally some additional functionality may be inserted into the application package. FIG. 2A then shows an application package after app wrapping. The modified application package includes the original application code along with the app wrapper and added functionality. In one or more example implementations, the app wrapper and added functionality may be inserted into a pre-built or commercial application without the involvement of the original application developer.

FIG. 2B shows an application package, after app wrapping, which includes the original application code along with the app wrapper, and the added functionality residing outside the application package. The added functionality may communicate with the application via the app wrapper. Accordingly, in some example implementations, the added functionality can be updated or otherwise modified without requiring re-wrapping.

As a result, example app wrapping techniques may be applicable to (a) app wrapping where functionality is added to the application package and resides inside the application package, and (b) app wrapping where some or all of the added functionality resides outside the application package and can be updated without re-wrapping.

Interception of Events and API Calls

Figure 3:
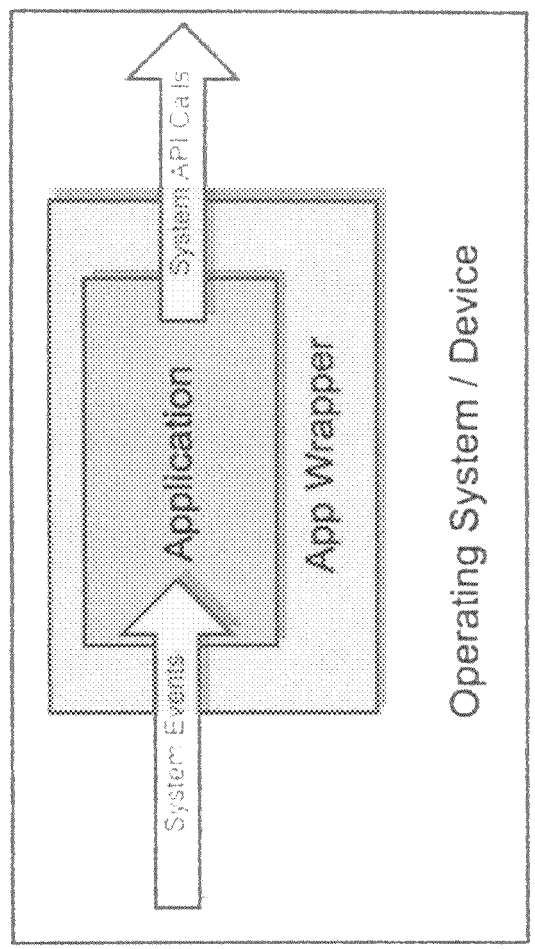
FIG. 3 illustrates an interception of system calls by the application wrapper according to at least one example embodiment.

FIG. 3 illustrates the interception of system calls by the app wrapper. As shown in FIG. 3, intercepted system calls can be either (a) system events or (b) system API calls. The app wrapper can broker system events and system API calls. System events are generated in the operating system and called into the application. System API calls originate in the application and call into the operating system. In at least on example implementation, app wrapping techniques enable intercepting system events and API calls without the involvement of the developer. Typically, system events and API calls are done under the control of the developer via the original application code. Using the technique described herein, pre-built or commercial applications can be app-wrapped, and the app wrapper can intercept or broker system events and API calls without using or modifying the original application code.

Figure 4:
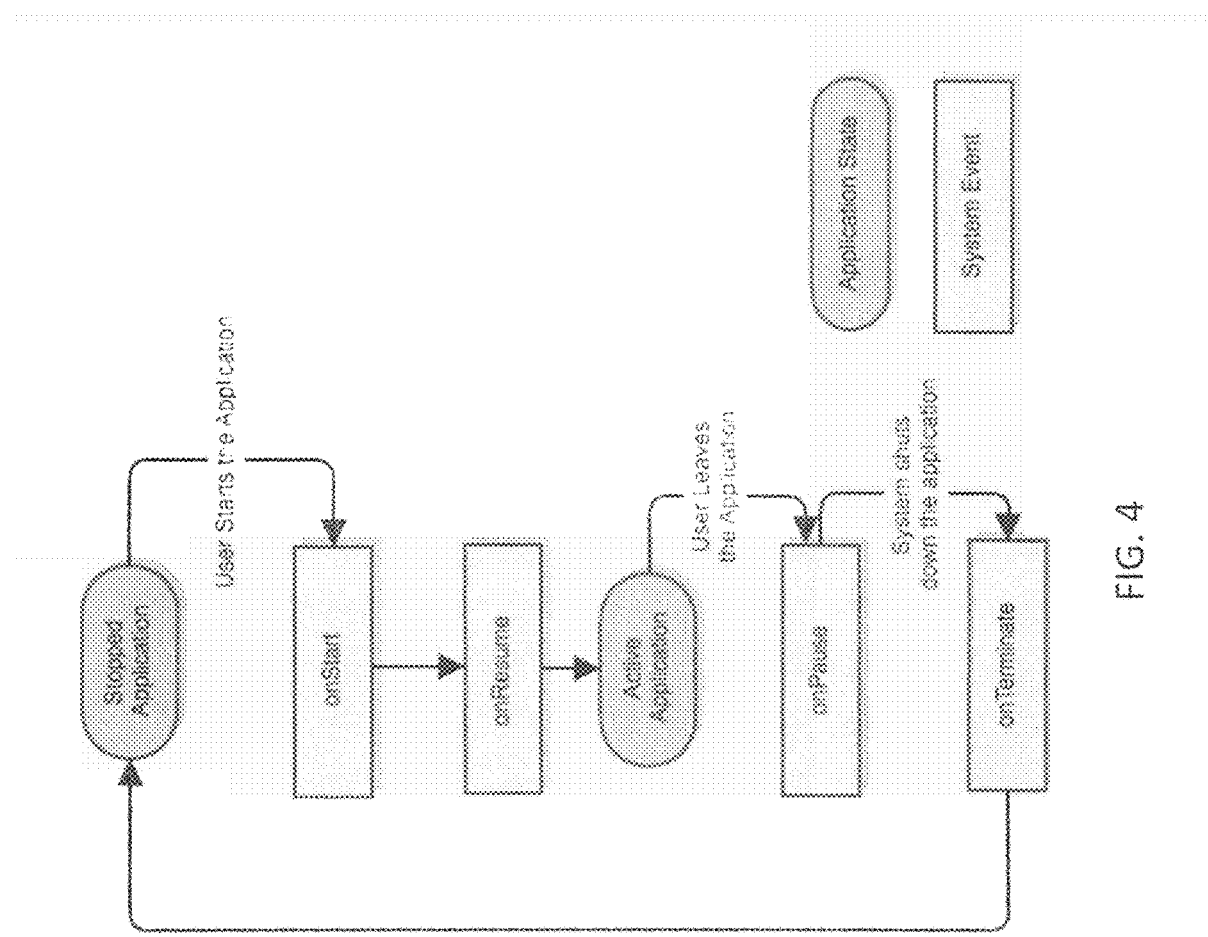
FIG. 4 illustrates an application lifecycle according to at least one example embodiment.

FIG. 4 shows an example application lifecycle. The lifecycle shown in FIG. 4 is typical of an Android application lifecycle, for example.

FIG. 4 shows some example types of system events and when they occur in the lifecycle of the application. In the example shown in FIG. 4, the types of system events are "onStart", "onResume", "onPause" and "onTerminate". In the same example, the application can be in one of two states—"stopped" or "active". System events "onStart" and "onResume" occur after a user has started or re-started a stopped application. Once started (or resumed), the application is active. When a user leaves the application, there is an "onPause" system event. When the system shuts down the application, there is an "onTerminate" system event, and the application is stopped.

The app wrapper from FIG. 3 can intercept a system event (such as the ones shown in FIG. 4), and perform a different type of interception based on the application state, time or other factor. System events may be exposed to components of example app wrapping techniques by implementing a method callback, for example.

The app wrapper can, for example, intercept an "onResume" system event and perform checking to verify a user is permitted to run the application. At an "onPause" system event, the app wrapper can intercept the event and write secure data before the application is terminated, for example. Secure data can be written, for example, on a disk or in cloud storage.

FIGS. 5A through 5D illustrate the processing of system calls for normal operation, interception, blocking and simulation, respectively. In general, interception of system events and API calls involves capturing the event (or call), performing a function, and then delegating the event (or call) to its original destination.

Figure 5A:
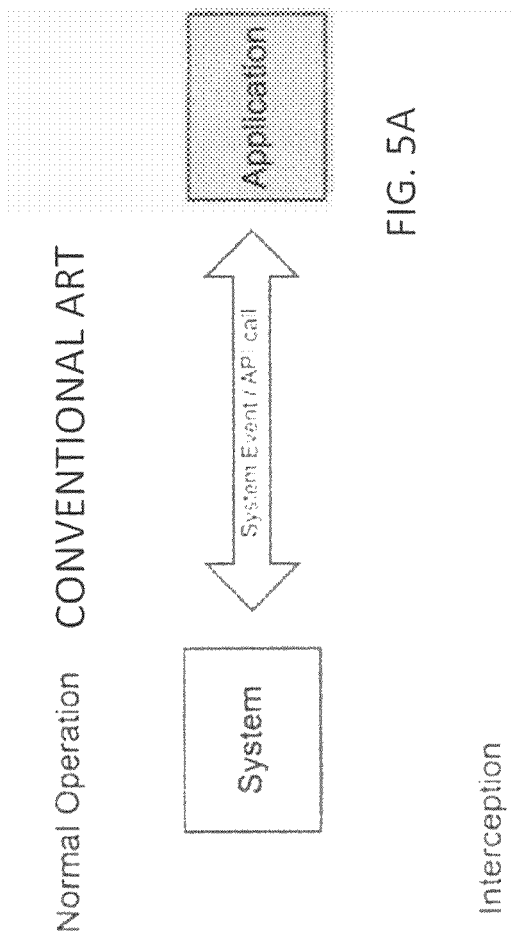
FIG. 5A illustrate a processing of system calls for normal operation according to conventional art.

FIG. 5A illustrates conventional interaction between system and application during normal operation. System events and API calls are passed between the system and the application as shown.

Figure 5B:
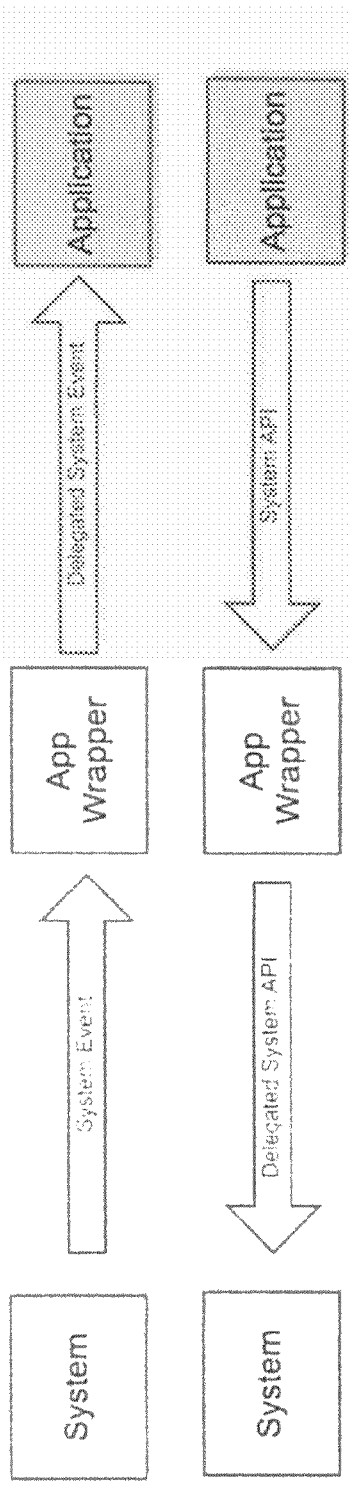

FIG. 5B illustrates the interception of system events and API calls by the app wrapper. In FIG. 5B, the system generates a system event in response to a user event or another system event. For example, the system may generate a "launch app" event in response to the user tapping on an app in the user interface on the device. The event is intercepted (or captured) by the app wrapper. The app wrapper may perform a function before delegating the system event to its original destination in the application. Also in FIG. 5B, the application generates a system API call. The call is intercepted by the app wrapper. The app wrapper may perform a function before delegating the API call to its original destination in the system.

FIG. 5C illustrates the interception and blocking of system events and API calls by the app wrapper. Blocking prevents propagation of the event or call beyond the app wrapper. Blocking can be based on business logic in the app wrapper, for example. Consider an example scenario in which the system generates an "onResume" event and the event is intercepted by the app wrapper. If the logic in the app wrapper determines that the application is not authorized to resume, then the app wrapper blocks the event and refuses to delegate it to a forward destination such as, for example, its original destination in the application.

FIG. 5D illustrates the interception and modification/simulation of system events and API calls by the app wrapper. In this scenario, an app wrapper can send one or more simulated or modified events to an application, or one or more simulated or modified API calls to the system. The scenario can be triggered by the interception of a system event or API call, or can be initiated by the app wrapper. Simulated events and API calls may not necessarily be related to actual events generated by the system or API calls made by the application.

Application Wrapping Workflow and Configuration

Figure 6:
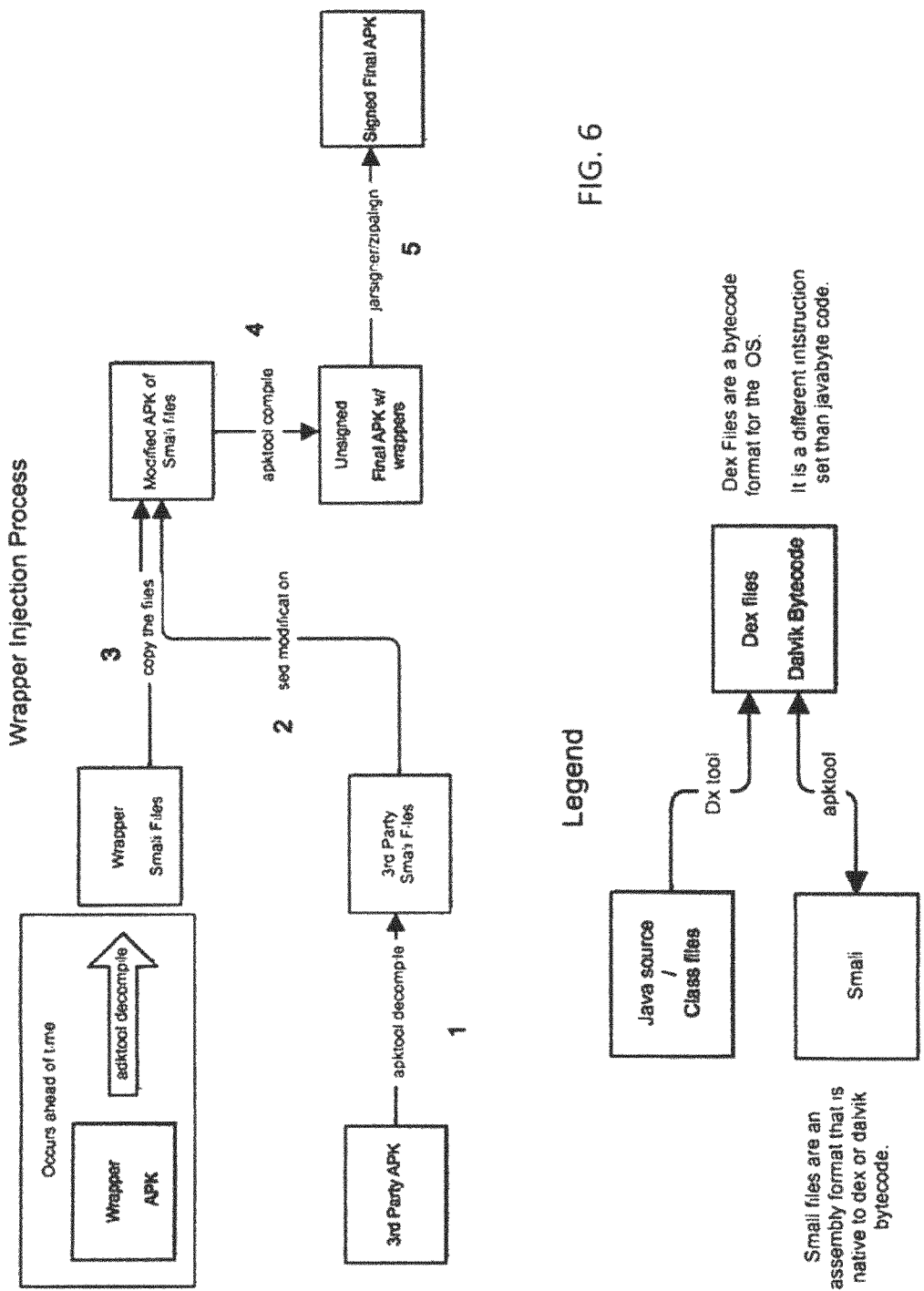
FIG. 6 illustrates an example application wrapping workflow according to at least one example embodiment.

FIG. 6 shows an example application wrapping workflow. The present application wrapping technique has an app wrapping approach that allows different types of functionality to be injected into a pre-built or commercial mobile application without the involvement of the developer. Examples of different types of functionality include, but are not limited to, license checking and verification, security sandboxing, and data encryption. Other examples of added functionality can include usage tracking, reporting, and analytics.

The present app wrapping technique can bind the identity of a company to a commercial application, thereby licensing the application for use by the company, and issuing, retracting, and re-issuing application licenses. The system, or system administrator, can perform and enforce these actions.

The injection process follows a similar workflow for each type of functionality added to the application. Details of the steps may vary depending on the functionality. FIG. 6 shows a workflow for injecting additional functionality into a third party application.

Before step 1 in the workflow shown in FIG. 6, code containing the additional functionality is converted to a low level (e.g., assembly) language format. For example, the code containing the additional functionality may be converted from ".dex" format to "smali" via a tool such as the apktool. At step 1 in FIG. 6, the third party application package is decompiled using a suitable tool. In the example embodiment shown in FIG. 6, the third party application is an Android .apk package, and can be decompiled using the apktool to produce "smali" files. At step 2 in FIG. 6, the decompiled files can be modified to facilitate the third party application calling into the additional functionality being provided by the app wrapper. This step may vary depending on the type of functionality being added by the app wrapper.

At step 3, the app wrapper files are merged with the decompiled (and modified) third party application files. At step 4, the wrapped application is re-compiled into an unsigned application package. For example, in the case of an Android application, the wrapped application is re-compiled into an .apk file.

At step 5 in FIG. 6, the app package is signed using the app wrapper developer's key.

FIGS. 7A through 7D are functional block diagrams showing where the app wrapper logic can reside in different example embodiments. The upgrade path for the app wrapper logic may vary depending on where the logic resides.

Figure 7A:
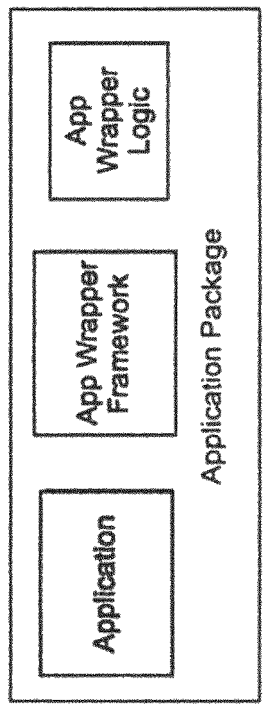
FIG. 7A-7D illustrate functional block diagrams showing where the application wrapper logic can reside in different example embodiments.

FIG. 7A illustrates a case where the app wrapper logic is contained in the application package. FIG. 7A shows the application package comprising an application, an app wrapper framework and app wrapper logic.

Figure 7B:
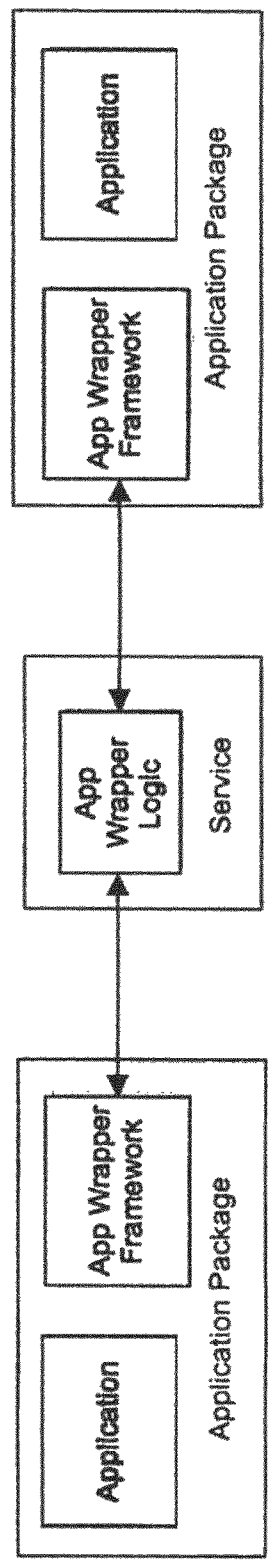

FIG. 7B illustrates a case where the app wrapper logic is provided by a service. FIG. 7B shows a service residing on the user computing device (e.g., mobile device) and including app wrapper logic. FIG. 7B also shows two different application packages each including an application and an app wrapper framework. The app wrapper logic is shared by the two applications. In general, the logic can be associated with one application, or can be shared by two or more different applications. The benefit of this configuration is that the app wrapper logic can be upgraded without requiring the application(s) to be re-wrapped.

Figure 7C:
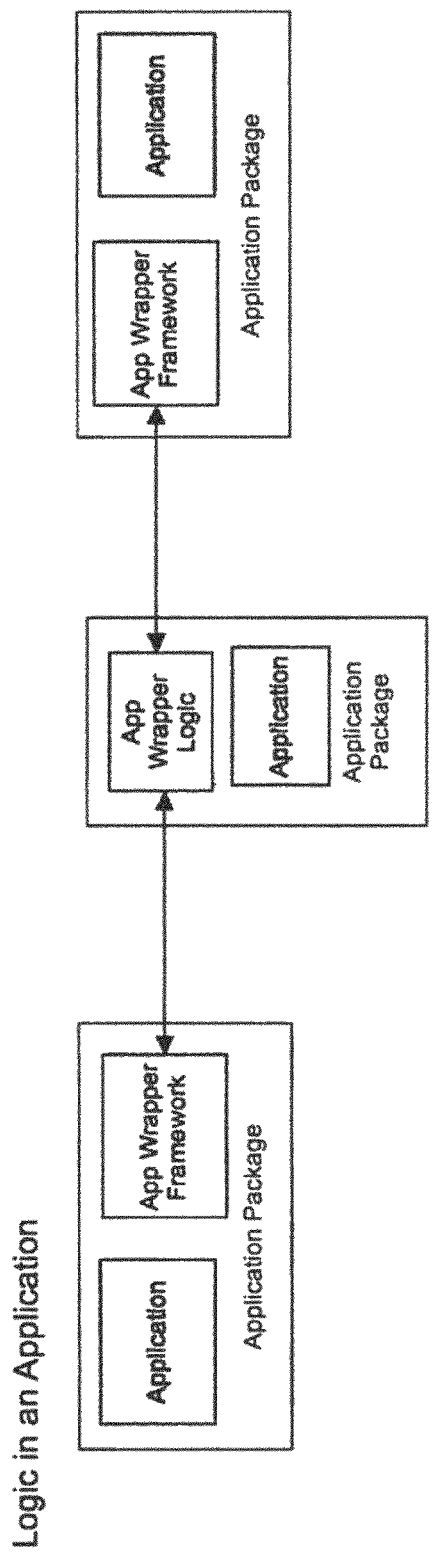

FIG. 7C illustrates a case where the app wrapper logic is part of an application residing on a mobile device. FIG. 7C shows an example in which the app wrapper logic is shared between two different applications, each including an application and an app wrapper framework. FIG. 7C shows an application package including an application and app wrapper logic. Like the case shown in FIG. 7B, the benefits of the configuration shown in FIG. 7C are that the app wrapper logic can be upgraded without requiring the application(s) to be re-wrapped.

Figure 7D:
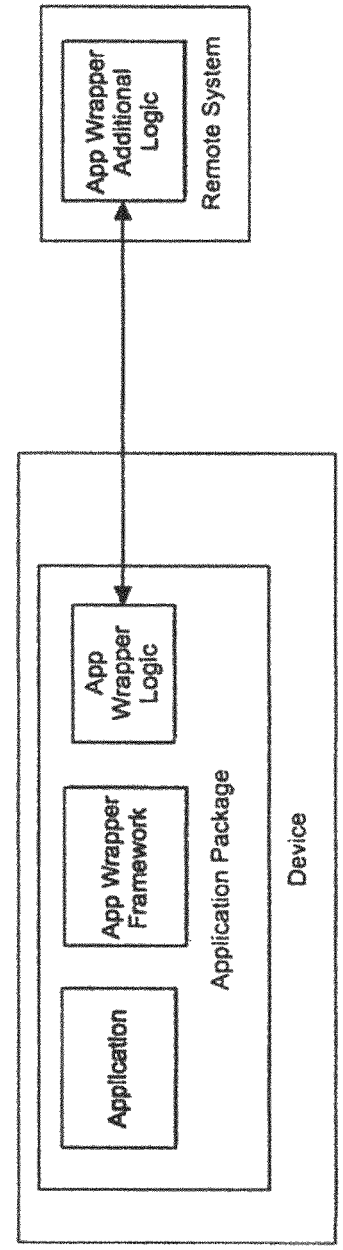

FIG. 7D illustrates a case where the app wrapper logic is split between two systems—a device and a remote system. This approach can be used in the 3 cases illustrated in FIG. 7A through 7C. FIG. 7D illustrates an approach for the "embedded logic" scenario shown in FIG. 7A.

FIG. 7D shows an application package residing on a user computing device (e.g., mobile device) and including an application, an app wrapper framework and app wrapper logic. The app wrapper logic on the device can communicate with app wrapper logic residing on a remote system, as shown in FIG. 7D. The app wrapper logic on the remote system can be upgraded without requiring re-wrapping of the application on the user computing device.

Use Cases/Example Workflows

FIGS. 8-11 are flow charts of methods according to example embodiments. The steps described with regard to FIGS. 8-11 may be performed due to the execution of software code stored in a memory (e.g., one or more of the memories shown in FIG. 12) associated with an apparatus (e.g., as shown in FIG. 12) and executed by at least one processor (e.g., one or more of the CPU's shown in FIG. 12) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 8-11.

Figure 8:
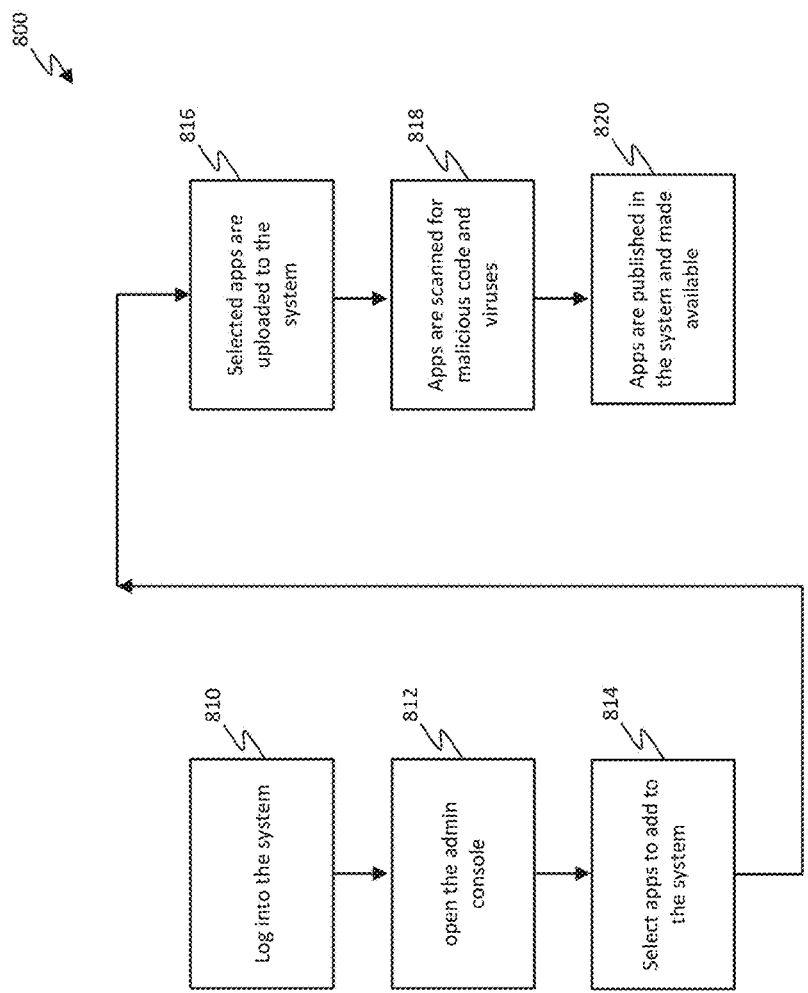
FIGS. 8-11 illustrate flow charts of example workflows according to at least one example embodiment.

FIG. 8 is a flow chart describing an example workflow method according to an example embodiment. In the example described with regard to method 800, the method may apply to a development computing device (e.g., as used by a developer of an application) when an application is uploaded and published for distribution to one or more user computing devices. Using the development computing device a developer can publish an app as an application package with compiled code and other resources as required or desired. After that, the development computing device (and as a result the developer) is not involved in the app wrapping process related to the described app wrapping techniques.

Method 800 begins at step 810, where a development computing device logs in to the system. For example, a user (e.g., an application developer) using the development computing device 1210 logs into the platform provider system 1250. The method proceeds to step 812 where an admin console is opened. After the admin console is open, the method proceeds to step 814 where apps are selected to add to the system. The method proceeds to step 816 where the selected apps are uploaded to the system. For example, admin console 1258 is opened and applications stored on development computing device 1210 are selected for addition to application datastore 1260. In step 818 the apps are scanned for malicious code and viruses. Once the scanning is complete, the method proceeds to step 820 where the apps are published in the system and made available to system administrators.

Figure 9:
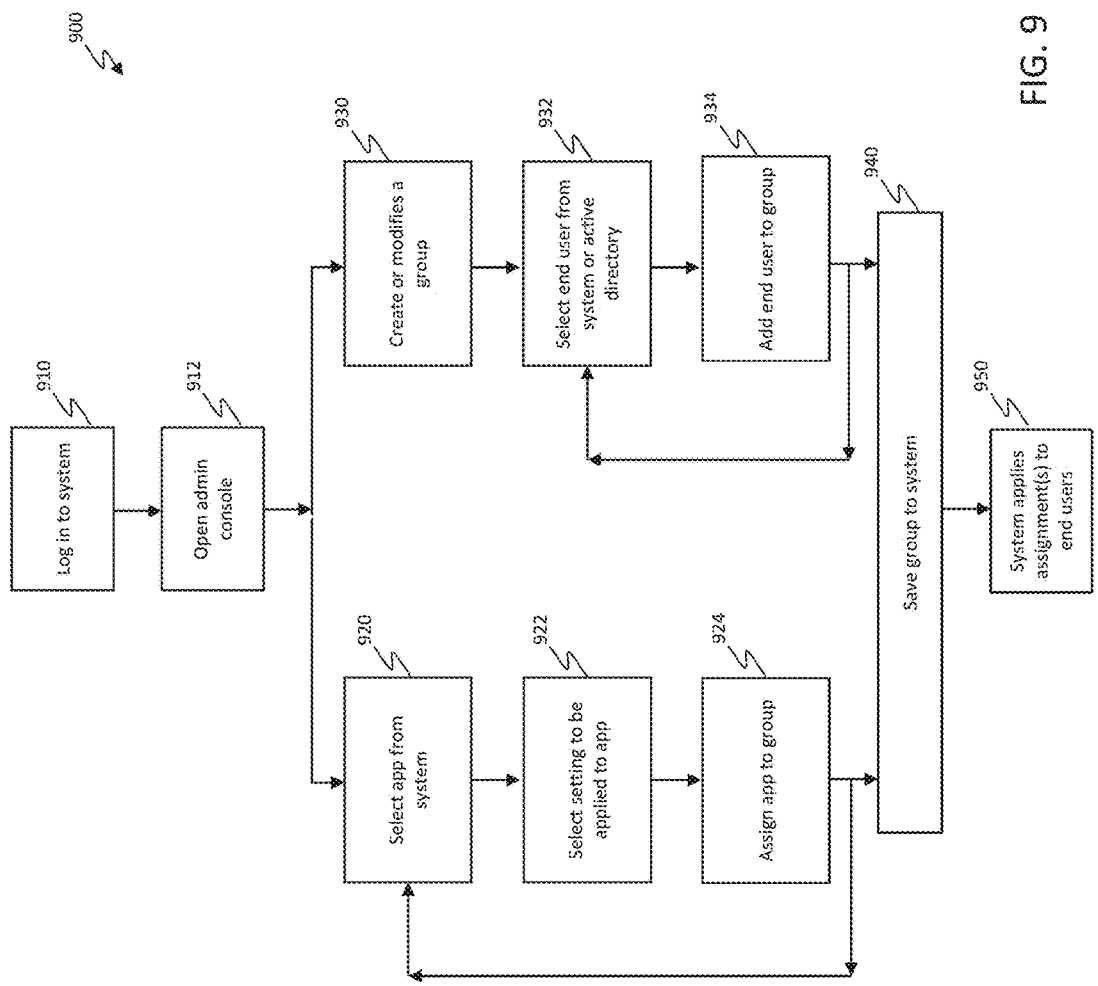

FIG. 9 is a flow chart describing an example workflow method according to an example embodiment. In the example described with regard to method 900, the method may apply to a platform provider system (e.g., as managed by a system administrator) when used for managing and configuring the apps that have been uploaded to the system by, for example, a development computing device. This can include creating and modifying groups of end users, and assigning apps to groups. The app wrapping technique described herein enables the platform provider system to implement rules and policies related to the published apps. Rules and policies can be implemented in an automatic fashion by the system without the direct involvement of a system administrator. Alternatively, and/or in addition to, the system administrator may set rules and policies using, for example, a set of menus provided by the platform provider system.

Method 900 is for a platform provider system (e.g., platform provider system 1250) to make changes to groups and to assign apps to end users. The steps described with regard to method 900 may be performed by a system administrator and/or automatically when, for example, an application is added to the system. Method 900 starts at step 910 where the administrator logs into the system and proceeds to step 912 where the administrator opens an admin console. If the system administrator would like to assign apps to a group, then the method proceeds to step 914 where the administrator selects apps from the system. The method then proceeds to step 916 where the administrator selects the settings to be applied to each of the apps selected in step 914. The method proceeds to step 918 where the administrator assigns the selected apps to a group, and then proceeds to step 940.

If the system administrator would like to make changes to groups, then the method proceeds directly from step 912 to step 930 where the administrator creates or modifies a group. The method then proceeds first to step 932 where the administrator selects an end user from the active directory and then to step 934 where the administrator adds the selected user to the group. Steps 932 and 934 are repeated until the desired end users have been added to the group. The method then proceeds to step 940.

At step 940, the administrator saves the group (including end users, apps and app settings) to the system. The method proceeds to step 950 where the system applies the assignments to the end users.

Figure 10:
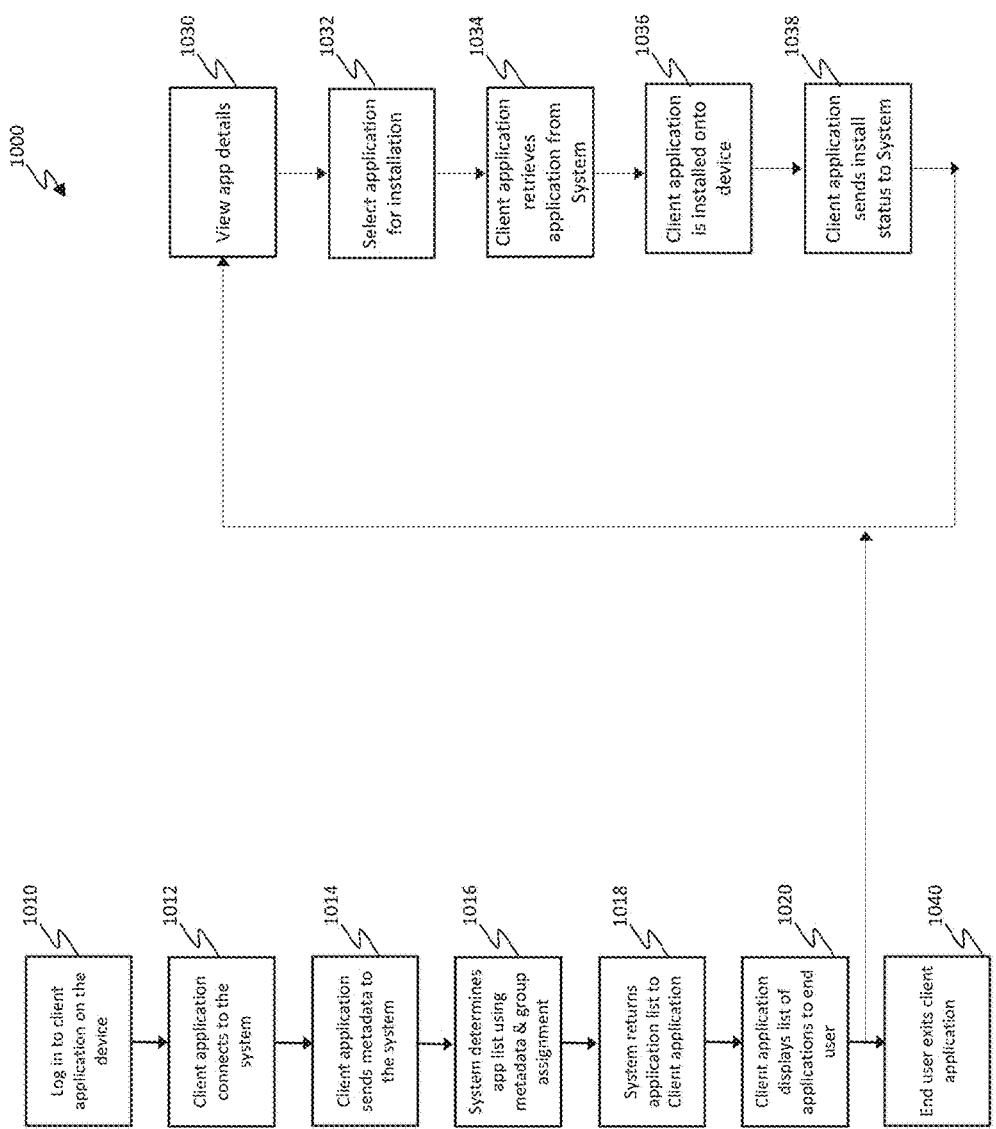

FIG. 10 is a flow chart describing an example workflow from the perspective of a user computing device (e.g., user computing device 1230). The app wrapping technique is transparent to a user the user computing device. The user can be presented (e.g., on a display of the user computing device) with a list of applications available to the user, and can select which ones to install. The present app wrapping technique described herein allows a platform provider system (e.g., platform provider system 1250) to control and manage the distribution and use of the available apps through app wrapping logic.

The workflow is described by a method shown in FIG. 10. The method begins at step 1010 where the user logs in to the client application on the user computing device (e.g., user computing device 1230), and the method proceeds to step 1012. At step 1012, the client application (e.g., an application configured to select and install other application, for example, an app store) connects to the platform provider system and the method proceeds to step 1014. At step 1014, the client application sends metadata to the platform provider system and the method proceeds to step 1016 where the platform provider system determines the list of applications using metadata and knowledge of the assignment of the end user to a group. The method proceeds to step 1018 where the platform provider system returns the application list to the client application. The method then proceeds to step 1020 where the client application displays a list of applications on a display of the user computing device.

At this point, the end user can take one of two actions—either tap on an application (as displayed on a display of the user computing device) to view details, in which case the method proceeds to step 1030, or exit the client application, in which case the method proceeds to 1040, the end user exits the client application and the method completes. If the method proceeds to step 1030, then tapping on the application will cause the method to proceed to step 1032 where the end user can select the application for installation (e.g., tap the install button). The method proceeds to steps 1034, 1036 and 1038 in sequence at which the client application retrieves the selected application from the platform provider system, installs the application on the device and sends an install status to the platform provider system.

Steps 1030 through 1038 can be repeated for multiple applications selected by the end user.

Figure 11:
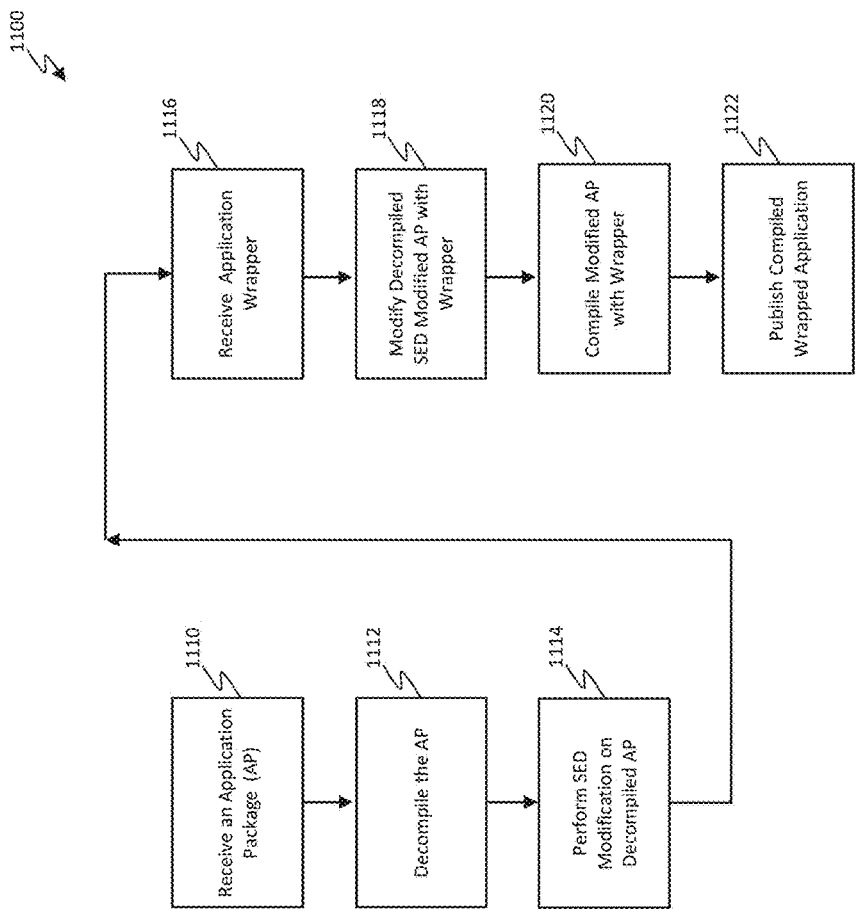
Figure 12:
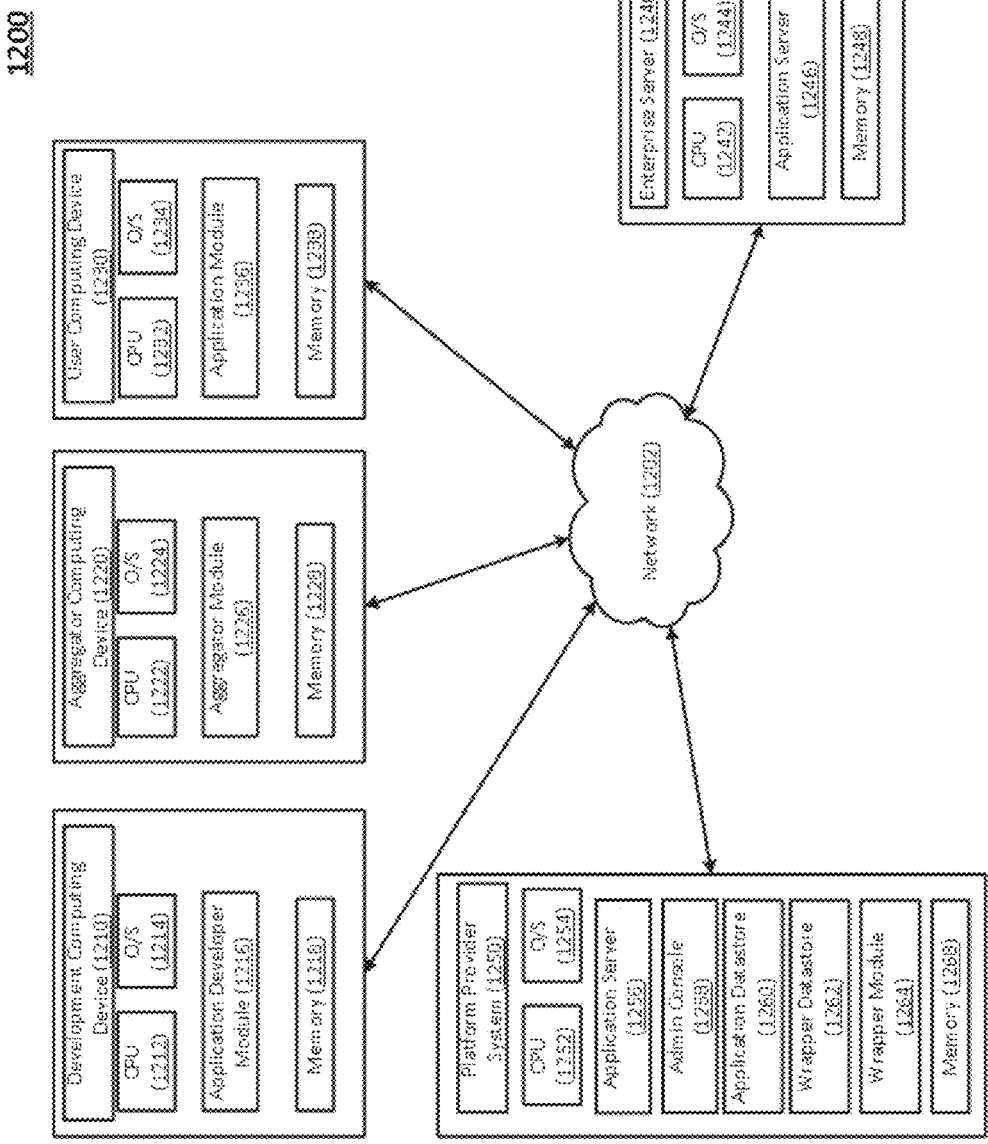
FIG. 12 illustrates a block diagram showing an example system architecture

FIG. 11 is a flow chart describing an example workflow method according to an example embodiment. In the example application wrapping workflow of FIG. 11, an application wrapper is interposed on a pre-written application before allowing a user computing device to download the pre-written application. As discussed in more detail above, the application wrapper may be configured to control an operation of the pre-written application.

In step 1110 an application package is received. For example, platform provider system 1250 may receive an application package (e.g., an .apk file for an Android application package). The application package may be received from a development computing device 1210. The application package may include the application's code (e.g., .dex files), resources, assets, and manifest file. The application package may be stored in the application datastore 1258.

In step 1112 the application is decompiled. For example, wrapper module 1262 may decompile the application using a suitable tool. For example, wrapper module 1262 may read the .apx file (of an Android application) from the application datastore 1258 and decompile the using the apktool to produce "smali" files.

In step 1114 a stream editor (SED) is used to modify the decompiled application package. For example, the SED may be used to search for string patterns and replace the string patterns with another string pattern in preparation for interposing the application wrapper. The SED may perform a line by line search and replace. The SED may modify the decompiled application package to facilitate calling the additional functionality being provided by the app wrapper. This step may vary depending on the type of functionality being added by the app wrapper.

In step 1116 an application wrapper is received. For example, platform provider system 1250 may receive an application wrapper. The application wrapper may be received from development computing device 1210 and/or an aggregator computing device 1220. The application wrapper may include the application wrapper code including code implementing additional functionality. The application wrapper code, containing the additional functionality, may be converted to a low level (e.g., assembly) language format. For example, the code containing the additional functionality may be converted from ".dex" format to "smali" via a tool such as the apktool. The application wrapper may be stored in the wrapper datastore 1260.

In step 1118 the decompiled modified application package is modified (e.g., merged) with the application wrapper code. For example, the app wrapper files are merged with the decompiled (and modified) application files.

In step 1120 application package and the wrapper code are compiled. For example, the wrapped application may be re-compiled into an unsigned application package. For example, in the case of an Android application, the wrapped application is re-compiled into an .apk file.

In step 1122 the compiled wrapped application is published. For example, the unsigned wrapped application package is signed using the app wrapper developer's key and exposed for download by user computing devices (e.g., user computing device 1230).

Other Embodiments

In another embodiment of the present app wrapping technique, an app wrapper class can be made part of an activity in the application lifecycle. This may mean the class can modify an original activity. For example, in an iOS application, the class can be at the operating system level and can manage the hand-off to the original activity.

Yet another embodiment of the present app wrapping technique is to modify the class directly, namely, to change the existing application code or add new code. This approach can involve modifying code in more than place and may be less scalable than other approaches described here.

In yet another embodiment, a customer (e.g. an enterprise) can add its own code to a pre-built or commercial application, and then app wrap it using the present app wrapping technique described here.

In other embodiments, the client may be running a user interface only, the application not residing on the device.

Example Architecture

FIG. 12 is a block diagram showing an example system architecture. The example system 1200 architecture includes a development computing device 1210, an aggregator computing device 1220, a user computing device 1230, a platform provider system 1250, an (optional) enterprise server 1240, and a network 1202. As will be appreciated the system 1200 may include one or more of each of these devices.

The development computing device 1210 includes at least one processor 1212, an operating system 1214, an application developer module 1216, and at least one memory 1218. The at least one processor 1210 and the at least one memory 1218 are communicatively coupled via a bus (not shown). The at least one processor 1210 and the at least one memory 1218 may be hardware (e.g., silicon based) physical devices. According to example implementations, the operating system 1214 manages hardware resources associated with development computing device 1210 and provides common services for computer programs executing on development computing device 1210. According to example implementations, the application developer module 1216 may be an integrated development environment (IDE) supporting any number of programming languages and configured to develop (e.g., code and compile) applications. The development computing device 1210 may be, for example, an element of any computing device (e.g., personal computer, a laptop computer and the like).

The aggregator computing device 1220 includes at least one processor 1222, an operating system 1224, an aggregator module 1226, and at least one memory 1228. The at least one processor 1220 and the at least one memory 1228 are communicatively coupled via a bus (not shown). The at least one processor 1220 and the at least one memory 1228 may be hardware (e.g., silicon based) physical devices. According to example implementations, the operating system 1224 manages hardware resources associated with aggregator computing device 1220 and provides common services for computer programs executing on aggregator computing device 1220. According to example implementations, the aggregator module 1226 may include a datastore of a plurality of applications and a mechanism to make the plurality of web applications available to other computing devices. The aggregator computing device 1220 may be, for example, an element of any computing device (e.g., a server, a cloud computing device, a personal computer, and the like).

The user computing device 1230 includes at least one processor 1232, an operating system 1234, an application module 1236, and at least one memory 1238. The at least one processor 1230 and the at least one memory 1238 are communicatively coupled via a bus (not shown). The at least one processor 1230 and the at least one memory 1238 may be hardware (e.g., silicon based) physical devices. According to example implementations, the operating system 1234 manages hardware resources associated with user computing device 1230 and provides common services for computer programs executing on user computing device 1230. According to example implementations, the application module 1216 may include a datastore including at least one application the tools to execute applications (e.g., a runtime) and a mechanism used to acquire/update applications. The user computing device 1230 may be, for example, an element of any computing device (e.g., personal computer, a laptop computer and the like).

The (optional) enterprise server 1240 includes at least one processor 1242, an operating system 1244, an application server 1246, and at least one memory 1418. The at least one processor 1240 and the at least one memory 1248 are communicatively coupled via a bus (not shown). The at least one processor 1240 and the at least one memory 1248 may be hardware (e.g., silicon based) physical devices. According to example implementations, the operating system 1244 manages hardware resources associated with enterprise server 1240 and provides common services for computer programs executing on enterprise server 1240. According to example implementations, the application server 1246 may be configured to enable a user device to indirectly download the applications associated with the platform provider. The enterprise server 1240 may be, for example, an element of any computing device (e.g., a networked computer, a cloud computer, and the like).

The platform provider system 1250 includes at least one processor 1252, an operating system 1254, an application server 1256, an application datastore 1258, a wrapper datastore 1260, a wrapper module 1262 and at least one memory 1258. The at least one processor 1250 and the at least one memory 1258 are communicatively coupled via a bus (not shown). The at least one processor 1250 and the at least one memory 1258 may be hardware (e.g., silicon based) physical devices. According to example implementations, the operating system 1254 manages hardware resources associated with platform provider system 1250 and provides common services for computer programs executing on platform provider system 1250. The platform provider system 1250 may be, for example, an element of any computing device (e.g., a networked computer, a cloud computer, and the like).

According to example implementations, the application server 1256 may be configured to enable a user device to download the applications associated with the platform provider. The application datastore 1258 and the wrapper datastore 1260 may be configured to store application packages and application wrappers, respectively. The wrapper module 1262 may be configured to interpose an application wrapper on a pre-written application before allowing a user computing device to download the pre-written application as discussed throughout this disclosure.

An administrator as a platform provider using the platform provider system 1250 may select pre-written applications supplied by developers via the development computing device 1210 and aggregators via the aggregator computing device 1220, and may present the applications in a marketplace hosted by the platform provider system 1250. An IT administrator can purchase applications and assign them to end-users operating the user computing device 1230. The platform provider system 1250 can use the system and methods described herein to wrap the purchased applications and then make them available for download to the user computing device 1230. In some embodiments, the user computing device 1230 can download the applications directly from the platform provider system 1250. In other embodiments, the user computing device 1230 can download the applications from a separate server, for example an enterprise server 1240 maintained by the IT administrator.

For example, a company with a mobile workforce may wish to provide its mobile employees with an app that enables remote access to their personal computer (PC)

desktops from a mobile device. In this example, let's assume an Information Technology (IT) administrator wishes to purchase multiple licenses of the remote desktop application for use by the company's employees. Using the system and method described herein, the IT administrator can view available applications and purchase a quantity of licenses using a credit card or purchase order. Once the application is purchased and made available to the IT administrator, along with the specified number of licenses, the IT administrator can assign the application to the employees.

The systems and methods described herein can automatically wrap the purchased application as part of the purchase process. The IT administrator can assign the purchased application to a group of employees and/or to individual employees. The application can be presented to the employee via the native iOS/Android device client and can allow the employee to install the application onto their mobile device. Once the application is assigned to the employees, via a group assignment or directly, the system can track and display the number of licenses that have been assigned to the employees. As each employee installs the application onto their mobile device and/or another device, the system can track and display the number of consumed licenses. If the employee leaves the company or decommissions their device, the system can disable the application so that it can no longer be used. The system can then recoup the license, and add it back to the number of available licenses for the application.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing"

or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method of administering a computing system, including a plurality of computing devices, the method comprising:
    selecting an application for inclusion in a menu of applications downloadable to a computing device; and
    interposing a wrapper on the application before the computing device downloads the application, the wrapper being configured to control an operation of the application, wherein interposing the wrapper on the application includes:
        decompiling the application, searching for string patterns, and replacing the string patterns with another string pattern, the another string pattern being configured to intercept at least one of a system event or an Application Programming Interface (API) call; and
        associating logic with the application, wherein
            the logic is configured to interact with the application via the at least one system event or API call,
            the logic is configured to provide additional functions to the application,
            the logic is configured to be shared between the application and at least one other application via at least one other wrapper, and
            the logic is stored separate from the application.
2. The method of claim 1, wherein the application is downloaded from the menu of applications.
3. The method of claim 2, wherein the downloading is performed indirectly via an intermediate server.
4. The method of claim 1, wherein the wrapper is configured to control distribution and use of the application.
5. The method of claim 1, wherein the wrapper is configured to verify that the computing device is authorized to download the application.
6. The method of claim 1, wherein the wrapper is configured to control storage of data associated with the application in the computing device.
7. The method of claim 6, wherein the data is fetched by the application.
8. The method of claim 6, wherein the data is generated by the application.
9. The method of claim 6, wherein the controlling of the storage of data includes prohibiting storage of data associated with the application in the computing device.
10. The method of claim 1, wherein the wrapper is configured to control access to the API.
11. The method of claim 10, wherein
    the API is configured to at least one of cut, copy and paste data between or within applications, and
    the wrapper is configured to interact with the API in order to control one of the cut, copy and paste data between or within applications.
12. The method of claim 10, wherein
    the API is configured to control file sharing between or within applications, and
    the wrapper is configured to interact with the API in order to control file sharing between or within applications.
13. The method of claim 1, wherein the wrapper is configured to impose at least one of day and time-of-day restrictions on operating the application.
14. The method of claim 1, wherein the wrapper is configured to impose location-of-use restrictions on operating the application.
15. A computing system including a plurality of computing devices, the system comprising:
    a processor;
    a menu of applications downloadable to a computing device;
    code segments, that when executed by the processor, enable the computing device to download an application; and
    code segments, that when executed by the processor, administer a wrapper configured to control operation of the application, wherein administering the wrapper includes:
        decompiling the application,
        searching for string patterns,
        replacing the string patterns with another string pattern, the another string pattern being configured to intercept at least one of a system event or an Application Programming Interface (API) call, and
        associating logic with the application, wherein
            the logic is configured to interact with the application via the at least one system event or API call,
            the logic is configured to provide additional functions to the application,
            the logic is configured to be shared between the application and at least one other application via at least one other wrapper, and
            the logic is stored separate from the application.
16. The system of claim 15, wherein the application is downloaded from the menu of applications.
17. The system of claim 16, wherein the downloading is performed indirectly via an intermediate server.
18. The system of claim 15, wherein the code segments that administer the wrapper are configured to verify that the computing device is authorized to download the application.
19. The system of claim 15, wherein the code segments that administer the wrapper are configured to control storage of data associated with the application in the computing device.
20. The system of claim 19, wherein the data is fetched by the application.

21. The system of claim 19, wherein the data is generated by the application.

22. The system of claim 19, wherein the code segments that administer the wrapper are configured to prohibit storage of data associated with the application in the computing device.

23. The system of claim 15, wherein the code segments that administer the wrapper are configured to control access to the API.

24. The system of claim 23, wherein
   the API is configured to at least one of cut, copy and paste data between or within applications, and
   the wrapper is configured to interact with the API in order to control one of the cut, copy and paste data between or within applications.

25. The system of claim 23, wherein
   the API is configured to control file sharing between or within applications, and
   the wrapper is configured to interact with the API in order to control file sharing between or within applications.

26. The system of claim 15, wherein the code segments that administer the wrapper are configured to impose at least one of day and time-of-day restrictions on operating the application.

27. The system of claim 15, wherein the code segments that administer the wrapper are configured to impose location-of-use restrictions on operating the application.

\* \* \* \* \*